US010263273B2

(12) United States Patent
Sato et al.

(10) Patent No.: US 10,263,273 B2
(45) Date of Patent: Apr. 16, 2019

(54) IN-VEHICLE FUEL CELL STACK

(71) Applicant: HONDA MOTOR CO., LTD., Minato-Ku, Tokyo (JP)

(72) Inventors: Takaharu Sato, Wako (JP); Masahiko Sato, Wako (JP); Masahiro Kawahara, Wako (JP); Akihiro Suzuki, Wako (JP); Takanori Mori, Wako (JP); Tsuyoshi Kobayashi, Wako (JP); Kazuma Sasaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 413 days.

(21) Appl. No.: 15/333,650

(22) Filed: Oct. 25, 2016

(65) Prior Publication Data

US 2017/0117571 A1   Apr. 27, 2017

(30) Foreign Application Priority Data

Oct. 27, 2015 (JP) ................................. 2015-211136
Oct. 27, 2015 (JP) ................................. 2015-211141

(51) Int. Cl.
| | |
|---|---|
| H01M 8/2475 | (2016.01) |
| H01M 8/04537 | (2016.01) |
| H01M 8/04858 | (2016.01) |
| B60K 1/04 | (2019.01) |
| B60K 1/00 | (2006.01) |
| H01M 8/04007 | (2016.01) |

(52) U.S. Cl.
CPC ............. *H01M 8/2475* (2013.01); *B60K 1/00* (2013.01); *B60K 1/04* (2013.01); *H01M 8/04037* (2013.01); *H01M 8/04552* (2013.01); *H01M 8/04873* (2013.01); *B60K 2001/0411* (2013.01); *B60Y 2306/01* (2013.01); *B60Y 2400/202* (2013.01); *H01M 2250/20* (2013.01); *Y02T 90/32* (2013.01)

(58) Field of Classification Search
CPC .... B60K 1/00; B60K 1/04; B60K 2001/0411; H01M 8/04037; H01M 8/04552; H01M 8/04873
See application file for complete search history.

(56) References Cited

U.S. PATENT DOCUMENTS

| | | | |
|---|---|---|---|
| 10,074,868 B2* | 9/2018 | Nara | ................. H01M 8/2404 |
| 2015/0251560 A1* | 9/2015 | Ishikawa | ................. B62D 21/15 |
| | | | 180/232 |
| 2017/0117571 A1* | 4/2017 | Sato | ................. H01M 8/04037 |
| 2017/0263967 A1* | 9/2017 | Nara | ................. H01M 8/2404 |

FOREIGN PATENT DOCUMENTS

| | | |
|---|---|---|
| JP | 2003-267063 A | 9/2003 |
| JP | 2009-283301 A | 12/2009 |
| JP | 2009-286206 A | 12/2009 |
| JP | 2013-041845 A | 2/2013 |

* cited by examiner

*Primary Examiner* — Abdullah A Riyami
*Assistant Examiner* — Nader J Alhawamdeh
(74) *Attorney, Agent, or Firm* — Carrier Blackman & Associates, P.C.; Joseph P. Carrier; William D. Blackman

(57) ABSTRACT

A cell voltage control unit is provided on a lower surface of a stack body of a fuel cell stack. The cell voltage control unit is connected to cell voltage terminals for monitoring cell voltage. A protection member is provided on a second end plate where the cell voltage control unit is provided. The protection member has protrusions protruding from both sides of the protection member in a horizontal direction, and a body portion having a vertically elongated shape so as to extend to a front face of the cell voltage control unit.

7 Claims, 10 Drawing Sheets

IN-VEHICLE FUEL CELL STACK

CROSS-REFERENCE TO RELATED APPLICATIONS

This application is based upon and claims the benefit of priority from Japanese Patent Applications No. 2015-211136 filed on Oct. 27, 2015, and No. 2015-211141 filed on Oct. 27, 2015, the contents all of which are incorporated herein by reference.

BACKGROUND OF THE INVENTION

Field of the Invention

The present invention relates to an in-vehicle fuel cell stack formed by stacking a plurality of power generation cells in a horizontal direction, and mounted in a vehicle.

Description of the Related Art

For example, a solid polymer electrolyte fuel cell employs a polymer ion exchange membrane as an electrolyte membrane, and the polymer electrolyte membrane is interposed between an anode and a cathode to form a membrane electrode assembly (MEA). The membrane electrode assembly and a pair of separators sandwiching the membrane electrode assembly make up a power generation cell for generating electricity. In use, typically, a predetermined number of the power generation cells are stacked together to form a fuel cell stack, e.g., mounted in a fuel cell vehicle (fuel cell electric automobile, etc.).

In the in-vehicle fuel cell stack, it is required to protect the fuel cells suitably against external loads such as vibrations and impacts during traveling of the vehicle. For example, a fuel cell protecting structure at a front portion of an automobile disclosed in Japanese Laid-Open Patent Publication No. 2003-267063 is known. In the fuel cell protecting structure, a fuel cell is arranged in a space in front of a dash panel provided at the front end of a vehicle compartment, and a structural body is disposed on the front side of the fuel cell in the traveling direction of the vehicle.

When a load is applied to this structural body from the front side to the rear side of the vehicle, the structural body rotates substantially horizontally, and abuts against a strut tower outwardly in a vehicle width direction. According to the disclosure, in this structure, it is possible to prevent damage to the fuel cell.

SUMMARY OF THE INVENTION

In the fuel cell stack, in order to detect whether each power generation cell has the desired power generation performance, normally, cell voltage monitoring terminals (cell voltage terminals) are mounted on separators. Each of the cell voltage monitoring terminals is connected to a cell voltage control unit (cell voltage ECU), to detect cell voltage of each power generation cell during power generation.

The cell voltage control unit is provided adjacent to the fuel cell stack. Therefore, it is desired to suitably protect the fuel cell stack and also the cell voltage control unit, which is a high voltage component, against the external loads such as vibrations or impacts during traveling of the vehicle.

The present invention has been made to meet the demand of this type, and an object of the present invention is to provide an in-vehicle fuel cell stack having a simple and economical structure in which it is possible to suitably protect a cell voltage control unit against external loads.

An in-vehicle fuel cell stack according to the present invention includes a stack body including a plurality of power generation cells stacked in a stacking direction, the power generation cells being configured to generate electrical energy by electrochemical reactions of a fuel gas and an oxygen-containing gas, laterally elongated end plates being provided at both ends of the stack body in the stacking direction.

A cell voltage control unit connected to a cell voltage terminal configured to monitor cell voltage is provided on an upper surface or a lower surface of the stack body. Further, a protection member is provided on one of the end plates where the cell voltage control unit is provided and the protection member has protrusions protruding from both sides of the protection member in a horizontal direction, and has a vertically elongated shape so as to extend to a front face of the cell voltage control unit.

Further, preferably, in the in-vehicle fuel cell stack, one end of the protection member in a longitudinal direction extends outward from the one end plate, and the protrusions lie in a plane of the one end plate.

Further, preferably, in this in-vehicle fuel cell stack, at one end of the protection member in the longitudinal direction, a recess is formed in a surface of the protection member that faces the one end plate.

In the present invention, the protection member is mounted on one of the end plates so as to extend to a front face of the cell voltage control unit. In the structure, when an external load is applied, since other components collide against the protection member, the external load can be absorbed by the protection member. Therefore, the external load is not directly applied to the cell voltage control unit, and it is possible to protect the cell voltage control unit.

Further, the protection member has protrusions protruding from both sides of the protection member in the horizontal direction. In the structure, when a moment load is applied to the protection member, the protrusions can reliably receive the moment load, and suppress deformation of the protection member as much as possible. Therefore, with the simple and economical structure, it is possible to suitably protect the cell voltage control unit against the external load.

Further, an in-vehicle fuel cell stack according to the present invention includes a stack body including a plurality of power generation cells stacked in a stacking direction, the power generation cells being configured to generate electrical energy by electrochemical reactions of a fuel gas and an oxygen-containing gas, laterally elongated end plates being provided upright at both ends of the stack body in the stacking direction.

A cell voltage control unit connected to a cell voltage terminal configured to monitor cell voltage is provided on an upper surface or a lower surface of the stack body. A bracket member to which a fuel cell auxiliary device is attached is provided on a front surface of one of the end plates where the cell voltage control unit is provided. The bracket member is bent in an L-shape, and has a first surface fixed to the front surface of the one end plate and a second surface to which the fuel cell auxiliary device is attached. An acute angle is formed between the first surface and the second surface in a side view of the bracket member.

Further, in this in-vehicle fuel cell stack, preferably, the fuel cell auxiliary device has a projection at a position remotest from the one end plate, and the projection is positioned below a bending fulcrum of the bracket member.

Further, in this in-vehicle fuel cell stack, preferably, projection of the fuel cell auxiliary device is positioned below a lower end of the second surface of the bracket member.

Further, in this in-vehicle fuel cell stack, preferably, the bracket member has a third surface positioned below the bending fulcrum, and the projection is positioned below the third surface.

In the present invention, the L-shaped bracket member to which the fuel cell auxiliary device is attached is provided in front of the one end plate where the cell voltage control unit is provided. In the structure, when an external load is applied, if the external load is inputted to the fuel cell auxiliary device, the bracket member is deformed, whereby the external load can be absorbed by the bracket member. Therefore, it is possible to prevent the fuel cell auxiliary device from being damaged by the external load. Further, the external load is not directly applied to the cell voltage control unit. With the simple and economical structure, it is possible to suitably protect the cell voltage control unit.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
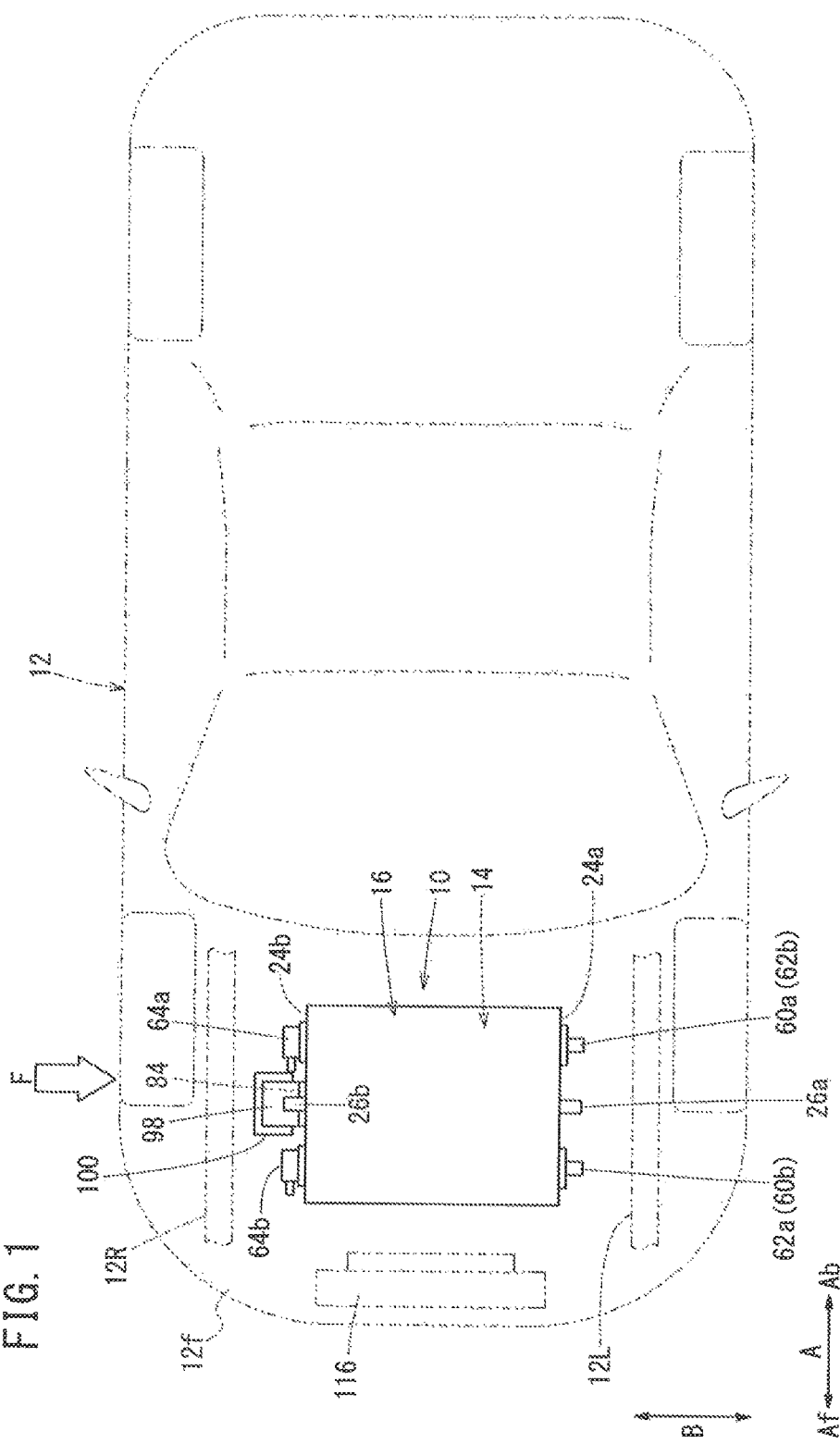
FIG. 1 is a plan view schematically showing a fuel cell electric vehicle equipped with a fuel cell stack according to an embodiment of the present invention.

As shown in FIG. 1, a fuel cell stack 10 according to an embodiment of the present invention is mounted in a front box (so called, motor room) 12f of a fuel cell electric vehicle (fuel cell vehicle) 12.

Figure 2:
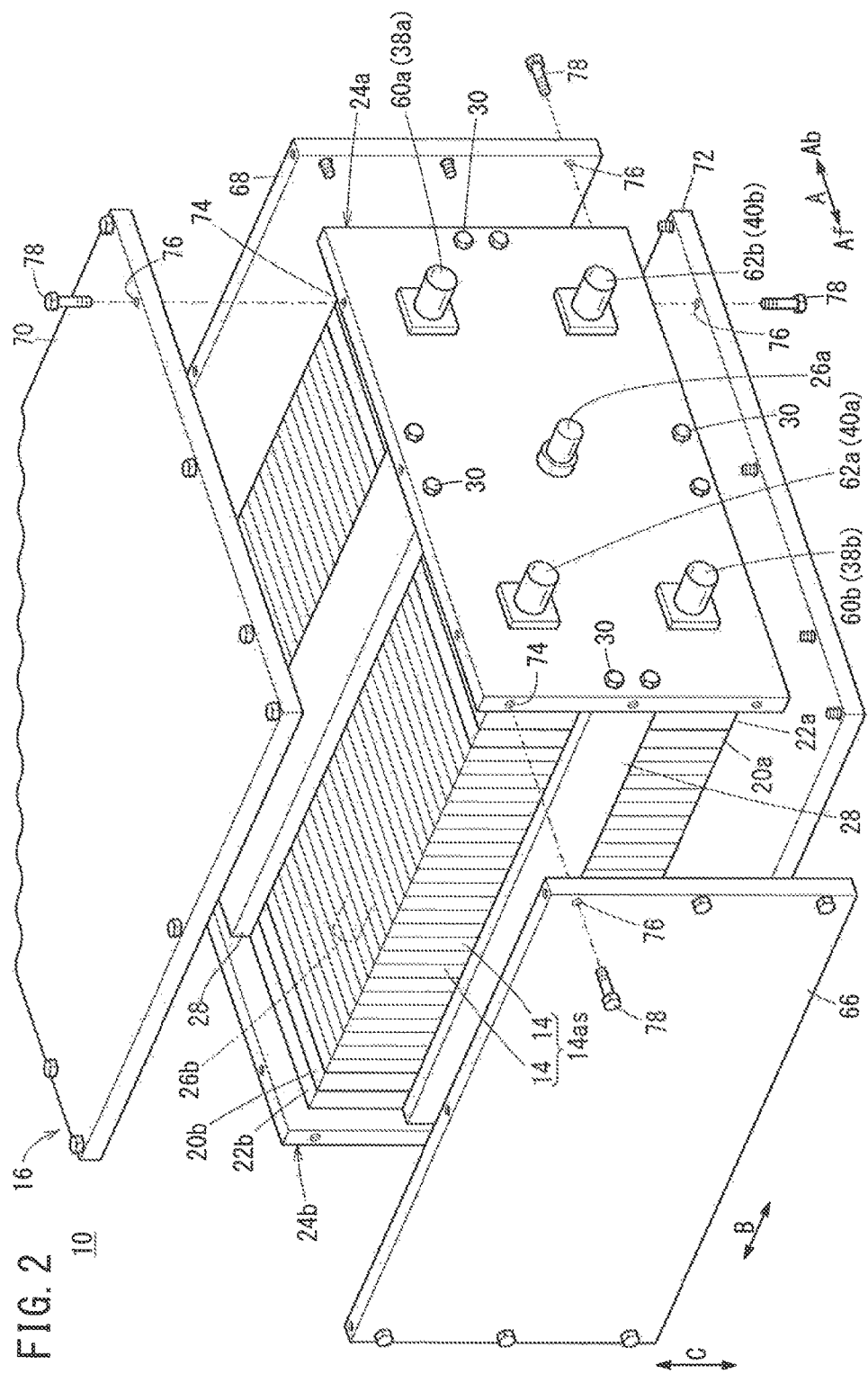
FIG. 2 is a partial exploded perspective view showing a casing containing the fuel cell stack.

The fuel cell stack 10 includes a plurality of stacked power generation cells 14, and a casing 16 containing the power generation cells 14 (see FIGS. 1 and 2). The casing 16 may be provided as necessary. Alternatively, the casing 16 may not be provided. As shown in FIG. 2, electrode surfaces of the power generation cells 14 are oriented upright, and the power generation cells 14 are stacked in a vehicle width direction (indicated by an arrow B) of the fuel cell electric vehicle 12 intersecting with a vehicle length direction (vehicle traveling direction) (indicated by an arrow A). It should be noted that the power generation cells 14 may be stacked in a vertical direction (vehicle height direction) indicated by an arrow C.

As shown in FIG. 1, in the front box 12f, frame members 12R, 12L as parts of a vehicle body frame extend in the direction indicated by the arrow A. The fuel cell stack 10 is arranged between the frame members 12R, 12L and mounted on another frame member (not shown). The fuel cell stack 10 may not be necessarily placed in the front box 12f. For example, the fuel cell stack 10 may be placed under the vehicle floor at the center of the vehicle, or in the vicinity of a rear trunk.

As shown in FIG. 2, a plurality of power generation cells 14 are stacked together in the direction indicated by the arrow B to form a stack body 14as. At one end of the stack body 14as in the stacking direction, a first terminal plate 20a, a first insulating plate 22a, and a first end plate 24a are arranged in this order from the inner side toward the outer side. At the other end of the stack body 14as in the stacking direction, a second terminal plate 20b, a second insulating plate 22b, and a second end plate 24b are arranged in this order from the inner side toward the outer side.

A first power output terminal 26a extends outward from a substantially central position (or a position deviated from the central position) of a laterally elongated (rectangular) first end plate 24a. The first power output terminal 26a is connected to the first terminal plate 20a. A second power output terminal 26b extends outward from a substantially central position of a laterally elongated (rectangular) second end plate 24b. The second power output terminal 26b is connected to the second terminal plate 20b.

Coupling bars 28 each having a constant length are provided respectively between central positions of face-to-face sides of the first end plate 24a and the second end plate 24b. Opposite ends of the coupling bars 28 are fixed to the first end plate 24a and the second end plate 24b by screws 30 to apply a tightening load to the stacked power generation cells 14 in the stacking direction indicated by the arrow B.

Figure 3:
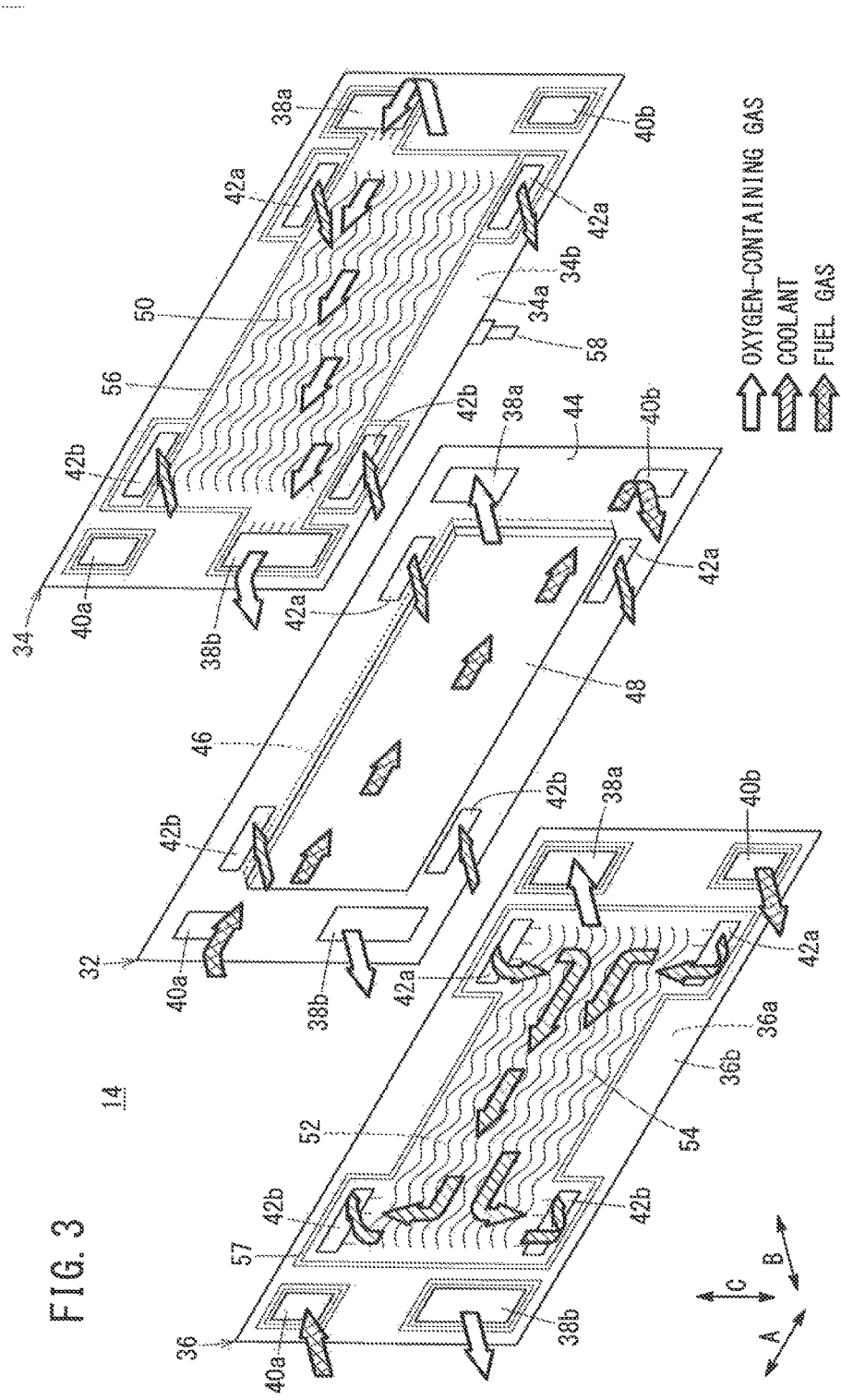
FIG. 3 is an exploded perspective view showing main components of a power generation cell of the fuel cell stack.

As shown in FIG. 3, the power generation cell 14 includes a membrane electrode assembly (MEA) 32 and a cathode separator 34, and an anode separator 36 sandwiching the membrane electrode assembly 32.

For example, the cathode separator 34 and the anode separator 36 are metal plates such as steel plates, stainless steel plates, titanium plates, aluminum plates, plated steel sheets, or metal plates having anti-corrosive surfaces by surface treatment. The cathode separator 34 and the anode separator 36 have rectangular surfaces, and are formed by corrugating metal thin plates by press forming to have a corrugated shape in cross section and a wavy shape on the surface. Instead of the metal separators, for example, carbon separators may be used as the cathode separator 34 and the anode separator 36.

The cathode separator 34 and the anode separator 36 have a laterally elongated shape including long sides extending in a horizontal direction indicated by the arrow A and short sides extending in a gravity direction indicated by an arrow C.

At one end of the power generation cells 14 in a long-side direction indicated by the arrow A, an oxygen-containing gas supply passage 38a and a fuel gas discharge passage 40b are provided. The oxygen-containing gas supply passage 38a and the fuel gas discharge passage 40b extend through the power generation cells 14 in the direction indicated by the arrow B. An oxygen-containing gas is supplied to the power generation cells 14 through the oxygen-containing gas supply passage 38a, and a fuel gas such as a hydrogen-containing gas is discharged from the power generation cells 14 through the fuel gas discharge passage 40b.

At the other end of the power generation cells 14 in the long-side direction, a fuel gas supply passage 40a and an oxygen-containing gas discharge passage 38b are provided. The fuel gas supply passage 40a and the oxygen-containing gas discharge passage 38b extend through the power generation cells 14 in the direction indicated by the arrow B. The fuel gas is supplied to the power generation cells 14 through the fuel gas supply passage 40a, and the oxygen-containing gas is discharged from the power generation cells 14 through the oxygen-containing gas discharge passage 38b.

At opposite marginal portions of the power generation cell 14 in the short-side direction indicated by the arrow C, two coolant supply passages 42a are provided on one side (i.e., on one end side in the horizontal direction) i.e., on a side closer to the oxygen-containing gas supply passage 38a and the fuel gas discharge passage 40b. The two coolant supply passages 42a extend through the power generation cells 14 in the direction indicated by the arrow B for supplying a coolant. The coolant supply passages 42a are provided respectively on upper and lower opposite sides.

At opposite marginal portions of the power generation cell 14 in the short-side direction, two coolant discharge passages 42b are provided on the other side (i.e., on the other end side in the horizontal direction) i.e., on a side closer to the fuel gas supply passage 40a and the oxygen-containing gas discharge passage 38b. The two coolant discharge passages 42b extend through the power generation cells 14 in the direction indicated by the arrow B for discharging the coolant. The coolant discharge passages 42b are provided respectively on upper and lower opposite sides.

The membrane electrode assembly 32 includes a cathode 46 and an anode 48, and a solid polymer electrolyte membrane 44 interposed between the cathode 46 and the anode 48. The solid polymer electrolyte membrane 44 is formed by impregnating a thin membrane of perfluorosulfonic acid with water, for example.

Each of the cathode 46 and the anode 48 has a gas diffusion layer (not shown) such as a carbon paper or the like, and an electrode catalyst layer (not shown) of platinum alloy supported on porous carbon particles. The carbon particles are deposited uniformly on the surface of the gas diffusion layer. The electrode catalyst layer of the cathode 46 and the electrode catalyst layer of the anode 48 are formed on both surfaces of the solid polymer electrolyte membrane 44, respectively.

The cathode separator 34 has an oxygen-containing gas flow field 50 on its surface 34a facing the membrane electrode assembly 32. The oxygen-containing gas flow field 50 is connected to the oxygen-containing gas supply passage 38a and the oxygen-containing gas discharge passage 38b. The oxygen-containing gas flow field 50 includes a plurality of wavy flow grooves (or straight flow grooves) extending in the direction indicated by the arrow A.

The anode separator 36 has a fuel gas flow field 52 on its surface 36a facing the membrane electrode assembly 32. The fuel gas flow field 52 is connected to the fuel gas supply passage 40a and the fuel gas discharge passage 40b. The fuel gas flow field 52 includes a plurality of wavy flow grooves (or straight flow grooves) extending in the direction indicated by the arrow A.

A coolant flow field 54 is formed between the adjacent anode and cathode separators 36, 34, i.e., between a surface 36b of the anode separator 36 and a surface 34b of the cathode separator 34. The coolant flow field 54 is connected to the coolant supply passages 42a and the coolant discharge passages 42b. The coolant flow field 54 extends in the horizontal direction, and in the coolant flow field 54, the coolant flows over the electrode area of the membrane electrode assembly 32.

A first seal member 56 is formed integrally with the surfaces 34a, 34b of the cathode separator 34, around the outer circumferential end of the cathode separator 34. A second seal member 57 is formed integrally with the surfaces 36a, 36b of the anode separator 36, around the outer circumferential end of the anode separator 36.

Each of the first seal member 56 and the second seal member 57 is an elastic seal member which is made of seal material, cushion material, packing material, or the like, such as an EPDM (ethylene propylene diene monomer), an NBR (nitrile butadiene rubber), a fluoro rubber, a silicone rubber, a fluorosilicone rubber, a Butyl rubber, a natural rubber, a styrene rubber, a chloroprene rubber, an acrylic rubber, or the like.

The cathode separator 34 has a cell voltage terminal 58 for voltage detection, the cell voltage terminal 58 protruding outward from the center on one long side. For example, the cell voltage terminal 58 is formed integrally with the metal thin plate of the cathode separator 34 so as to protrude from the outer edge on the long side of the metal thin plate. In the illustrated embodiment, the cell voltage terminal 58 is provided on the lower side of the power generation cell 14. However, the present invention is not limited in this respect, and the cell voltage terminal 58 may be provided on the upper side thereof.

As shown in FIG. 2, an oxygen-containing gas supply manifold member 60a, an oxygen-containing gas discharge manifold member 60b, a fuel gas supply manifold member 62a, and a fuel gas discharge manifold member 62b are connected to the first end plate 24a. The oxygen-containing gas supply manifold member 60a is connected to the oxygen-containing gas supply passage 38a, the oxygen-containing gas discharge manifold member 60b is connected to the oxygen-containing gas discharge passage 38b, the fuel gas supply manifold member 62a is connected to the fuel gas supply passage 40a, and the fuel gas discharge manifold member 62b is connected to the fuel gas discharge passage 40b.

Figure 4:
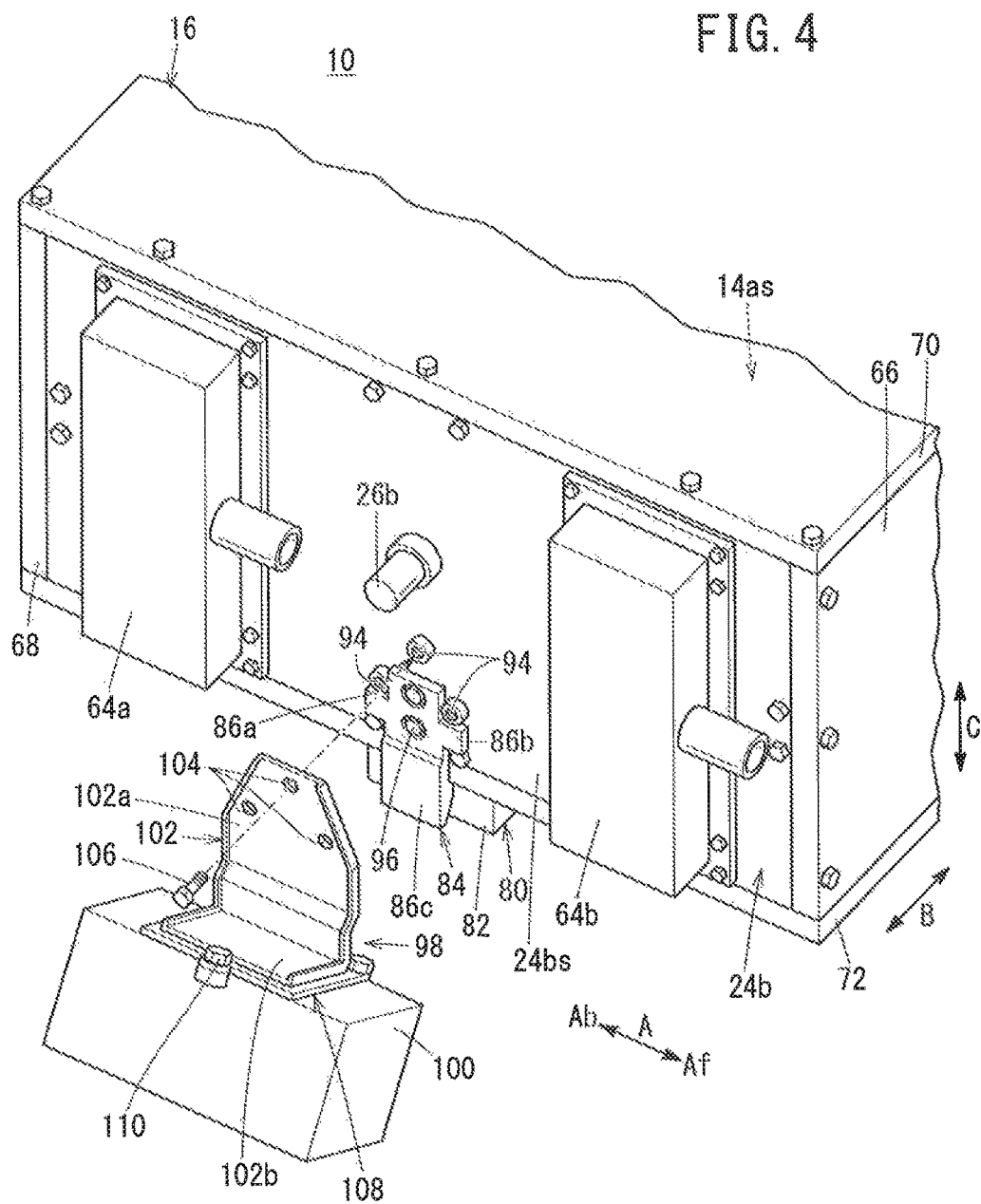
FIG. 4 is a partial exploded perspective view showing the fuel cell stack as viewed from a second end plate of the fuel cell stack.

As shown in FIG. 4, a coolant supply manifold member 64a is attached to the second end plate 24b. The coolant supply manifold member 64a is connected to a pair of coolant supply passages 42a. Further, a coolant discharge manifold member 64b is attached to the second end plate 24b. The coolant discharge manifold member 64b is connected to a pair of coolant discharge passages 42b.

As shown in FIG. 2, two sides (two faces) at both ends of the casing 16 in the vehicle width direction indicated by the arrow B are formed by the first end plate 24a and the second end plate 24b. Two sides (two faces) at both ends of the casing 16 in the vehicle length direction indicated by the arrow A are formed by a front side panel 66 and a rear side panel 68. The front side panel 66 and the rear side panel 68 are laterally elongated plates. Two sides (two faces) at both ends of the casing 16 in the vehicle height direction indicated by the arrow C are formed by an upper side panel 70 and a lower side panel 72. The upper side panel 70 and the lower side panel 72 are laterally elongated plates.

Screw holes 74 are formed on side edges of the first end plate 24a and the second end plate 24b. On the front side panel 66, the rear side panel 68, the upper side panel 70, and the lower side panel 72, holes 76 are formed at positions corresponding to the screw holes 74. The screws 78 are inserted through the holes 76, and screw-engaged into the screw holes 74, whereby the front side panel 66, the rear side panel 68, the upper side panel 70, and the lower side panel 72 are fixed to the first end plate 24a and the second end plate 24b.

Figure 5:
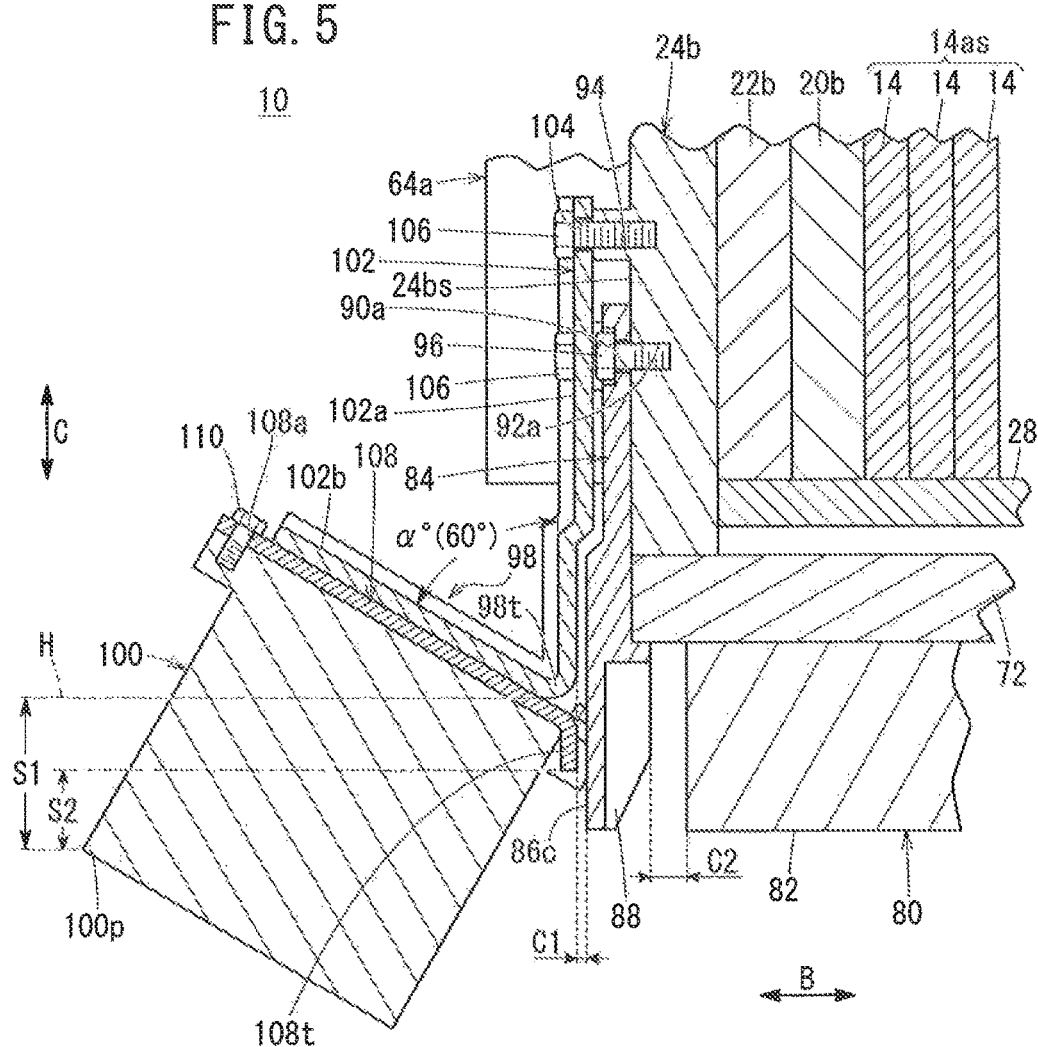
FIG. 5 is a cross sectional side view showing the second end plate of the fuel cell stack.

As shown in FIGS. 4 and 5, the fuel cell stack 10 is provided with a cell voltage control unit 80 on a lower surface (or on an upper surface) of the stack body 14as. The cell voltage control unit 80 includes a cover 82 fixed to the lower side panel 72 (or the upper side panel 70). Though not shown, the cover 82 contains high voltage components such as a harness connected to each cell voltage terminal 58, an ECU (electronic control unit) integrally connected to the harness, and the like.

Figure 6:
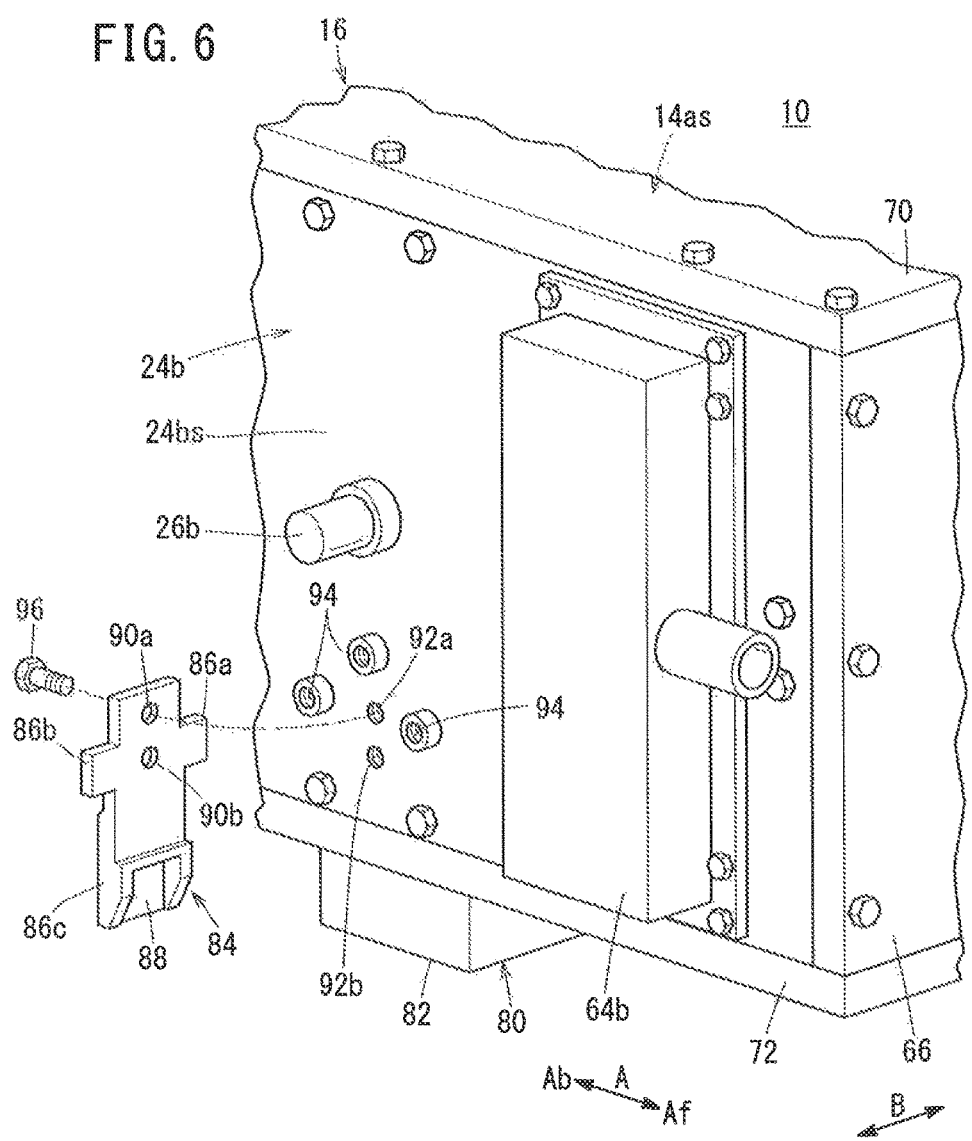
FIG. 6 is an enlarged perspective view as viewed from the second end plate of the fuel cell stack.

A protection member 84 is disposed on the second end plate 24b (one end plate) where the cell voltage control unit 80 is provided. The protection member 84 is made of a high strength material, e.g., quenched/tempered material such as carbon steel, chromium molybdenum steel. As shown in FIGS. 4 to 6, the protection member 84 includes protrusions 86a, 86b protruding horizontally from both sides of the protection member 84, and a body portion 86c having a vertically elongated shape.

A recess 88 is formed in a surface (back surface) of the body portion 86c facing the second end plate 24b for weight reduction. Holes 90a, 90b are arranged vertically on an upper part of the protection member 84.

As shown in FIG. 6, screw holes 92a, 92b are formed at lower end positions on the substantially central portion of the second end plate 24b. Three screw holes 94 having bosses are provided in the vicinity of the screw holes 92a, at positions corresponding to vertices of a substantially triangular shape. Screws 96 are inserted through the holes 90a, 90b of the protection member 84, and the front ends of the screws 96 are screw-engaged into the screw holes 92a, 92b, whereby the protection member 84 is fixed to the second end plate 24b (see FIG. 4). In the case where there are two holes 90b, two holes 92b are formed.

As shown in FIG. 4, in the state where the protection member 84 is attached to the second end plate 24b, the protrusions 86a, 86b lie in a plane of the second end plate 24b. The body portion 86c of the protection member 84 extends downwardly of the second end plate 24b, protrudes beyond the second end plate 24b, and then extends to the front face of the cell voltage control unit 80 (see FIGS. 4 and 5).

Figure 7:
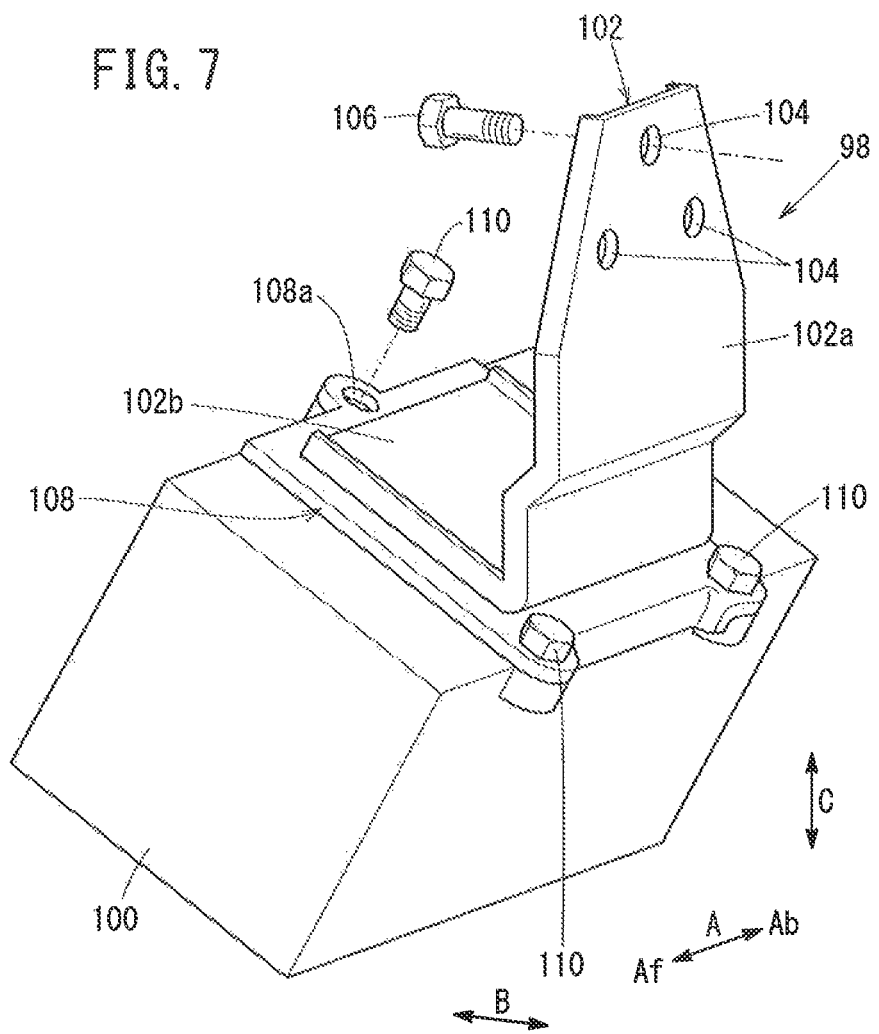
FIG. 7 is a perspective view showing a bracket member of the fuel cell stack and an electric heater.

A fuel cell auxiliary device such as an electric heater 100, which is a high voltage component, is attached to the second end plate 24b through a bracket member 98. For example, the bracket member 98 is made of a cold rolled steel (JSC270C, etc.). As shown in FIGS. 4, 5, and 7, the bracket member 98 has an attachment plate 102 bent in an L-shape at an acute opening angle α° (e.g., 60°). Three holes 104 corresponding to the three screw holes 94 of the second end plate 24b are formed in a first surface 102a of the attachment plate 102. The first surface 102a abuts against a front surface 24bs of the second end plate 24b, and extends in a vertical direction.

Screws 106 are inserted through the holes 104 and screw-engaged into the respective screw holes 94, whereby the bracket member 98 is fixed to the second end plate 24b. The bracket member 98 overlaps the protection member 84. The protection member 84 has the function of reinforcing the bracket member 98.

A flat plate 108 is fixed to a second surface 102b, e.g., by welding. The second surface 102b forms the bent portion of the attachment plate 102. For example, three holes 108a are formed in the flat plate 108. Screws 110 inserted through the holes 108a are screw-engaged into the electric heater 100 to thereby fix the electric heater 100 to the bracket member 98. As shown in FIG. 5, a third surface 108t is formed at an end of the flat plate 108 on the protection member 84 side. When a load is inputted (applied) to a projection 100p of the electric heater 100, the third surface 108t transmits the load to the protection member 84.

As shown in FIG. 5, in the bracket member 98, the opening angle α° formed between the first surface 102a and the second surface 102b is an acute angle, e.g., 60°, in a side view of the bracket member 98. In the bracket member 98, the second surface 102b extends obliquely upward from the lower end of the first surface 102a. The bracket member 98 has a bending fulcrum 98t.

The electric heater 100 is held by the second surface 102b in a manner that the electric heater 100 is inclined at an angle (90°−α°) (e.g., 30°) from the horizontal line H. The electric heater 100 has a projection 100p at a position remotest from the second end plate 24b. The projection 100p is one corner of the electric heater 100.

The projection 100p is spaced downward from the bending fulcrum 98t of the bracket member 98 by the distance S1. The projection 100p is positioned below the lower end of the flat plate 108 extending below the bending fulcrum 98t of the bracket member 98, and also positioned below the lower end position of the second surface 102b. Further, the projection 100p is spaced downward from the third surface 108t by the distance S2.

Clearance C1 is formed between the bracket member 98 and the protection member 84. For example, the clearance C1 is in a range of 1 mm to 5 mm. Clearance C2 is formed between the protection member 84 and the cover 82. For example, the clearance C2 is in a range of 6 mm to 13 mm.

Figure 8:
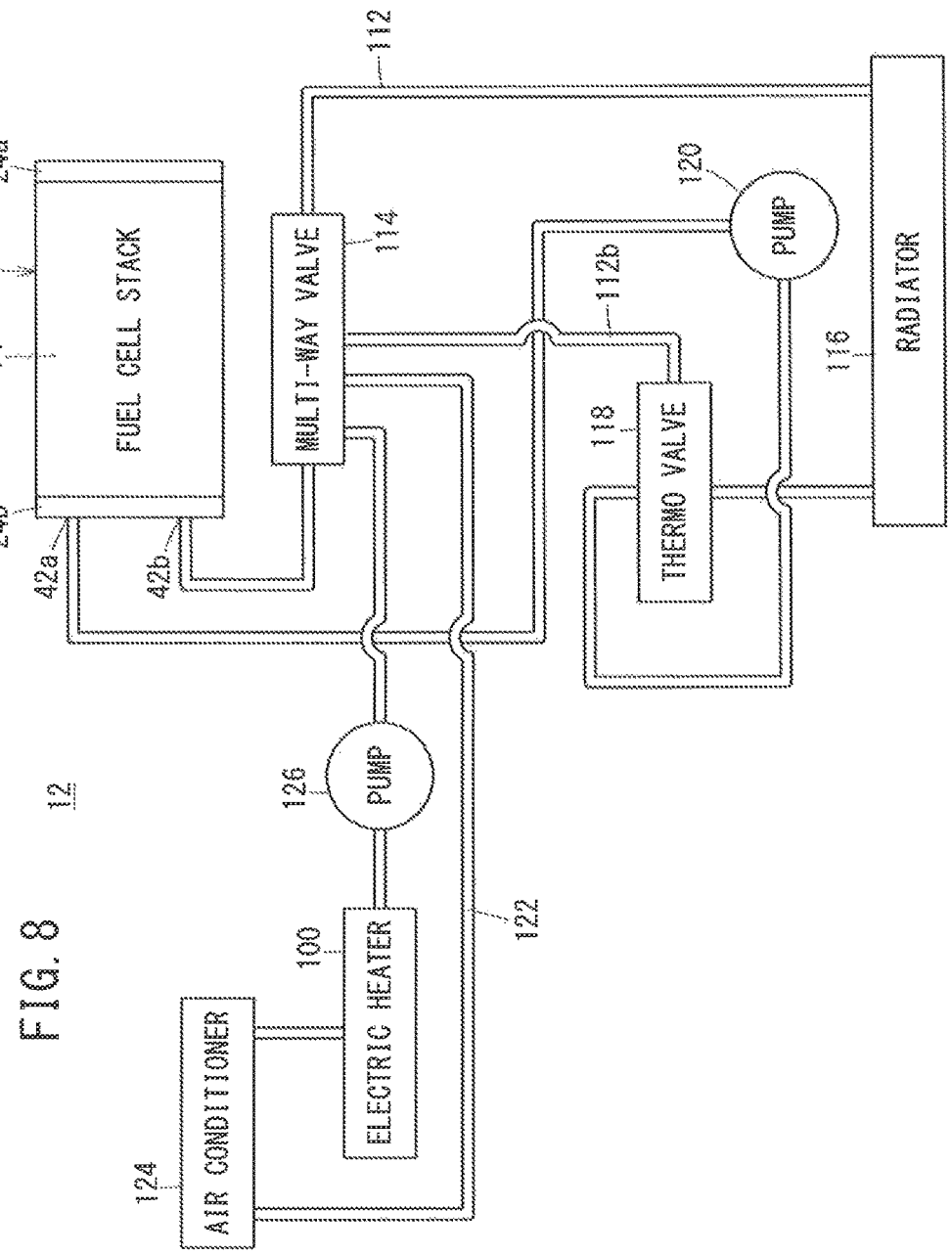
FIG. 8 is a diagram showing a coolant heating system of the fuel cell electric vehicle.

As shown in FIG. 8, the fuel cell electric vehicle 12 has a coolant circulation channel 112 for circulating the coolant, the coolant circulation channel 112 being connected to the coolant supply passage 42a and the coolant discharge passage 42b of the fuel cell stack 10. A multi-way valve 114, a radiator 116, a thermo valve 118, and a circulation pump 120 are provided in the coolant circulation channel 112. A bypass channel 112b is connected between the multi-way valve 114 and the thermo valve 118.

A heater circulation channel 122 is connected to the multi-way valve 114. An air conditioner 124, the electric heater 100, and a circulation pump 126 are connected to the heater circulation channel 122. The electric heater 100 heats the coolant to be supplied to the air conditioner 124 and performs heating operation by the air conditioner 124, while heats the coolant to be supplied to the fuel cell stack 10.

Operation of the fuel cell stack 10 having the above structure will be described below.

Firstly, as shown in FIG. 2, an oxygen-containing gas is supplied from the oxygen-containing gas supply manifold member 60a at the first end plate 24a to the oxygen-containing gas supply passage 38a. A fuel gas such as a hydrogen-containing gas is supplied from the fuel gas supply manifold member 62a at the first end plate 24a to the fuel gas supply passage 40a.

Further, as shown in FIG. 4, a coolant such as pure water, ethylene glycol, oil, or the like is supplied from the coolant supply manifold member 64a at the second end plate 24b to the pair of coolant supply passages 42a.

Thus, as shown in FIG. 3, the oxygen-containing gas flows from the oxygen-containing gas supply passage 38a into the oxygen-containing gas flow field 50 of the cathode separator 34. The oxygen-containing gas flows along the oxygen-containing gas flow field 50 in the direction indicated by the arrow A, and the oxygen-containing gas is supplied to the cathode 46 of the membrane electrode assembly 32 for inducing an electrochemical reaction at the cathode 46.

In the meanwhile, the fuel gas is supplied from the fuel gas supply passage 40a to the fuel gas flow field 52 of the anode separator 36. The fuel gas moves along the fuel gas flow field 52 in the direction indicated by the arrow A, and the fuel gas is supplied to the anode 48 of the membrane electrode assembly 32 for inducing an electrochemical reaction at the anode 48.

Thus, in the membrane electrode assembly 32, the oxygen-containing gas supplied to the cathode 46 and the fuel gas supplied to the anode 48 are consumed in the electrochemical reactions at catalyst layers of the cathode 46 and the anode 48 for generating electricity.

Then, the oxygen-containing gas partly consumed at the cathode 46 of the membrane electrode assembly 32 is discharged along the oxygen-containing gas discharge passage 38b in the direction indicated by the arrow B. In the meanwhile, the fuel gas partly consumed at the anode 48 of the membrane electrode assembly 32 is discharged along the fuel gas discharge passage 40b in the direction indicated by the arrow B.

Further, the coolant supplied to the pair of coolant supply passages 42a flows into the coolant flow field 54 between the cathode separator 34 and the anode separator 36. The coolant temporarily flows inward in the direction indicated by the arrow C, and then, the coolant moves in the direction indicated by the arrow A for cooling the membrane electrode assembly 32. After the coolant moves outward in the direction indicated by the arrow C, the coolant is discharged along the pair of coolant discharge passages 42b in the direction indicated by the arrow B.

Figure 9:
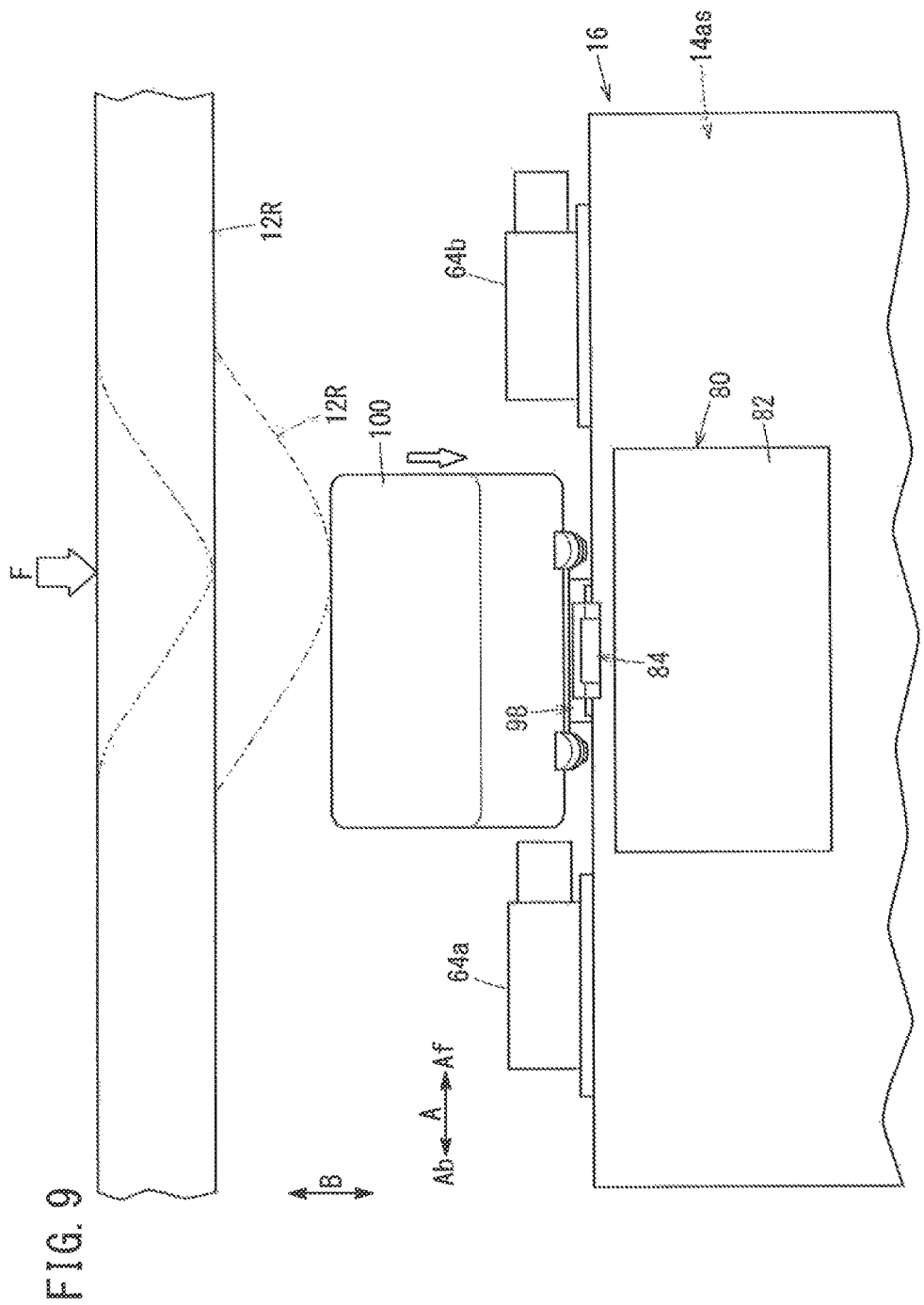
FIG. 9 is a view showing operation in a state where an external load is applied from the right side to the fuel cell electric vehicle, as viewed from below.

As described above, electrical energy from the fuel cell stack 10 is supplied to the fuel cell electric vehicle 12 for allowing travel of the fuel cell electric vehicle 12. At this time, as shown in FIG. 9, when an external load F (impact) is applied from the right side to the fuel cell electric vehicle 12 in the vehicle width direction indicated by the arrow B, the side portion of the fuel cell electric vehicle 12 tends to be deformed inward easily.

Figure 10:
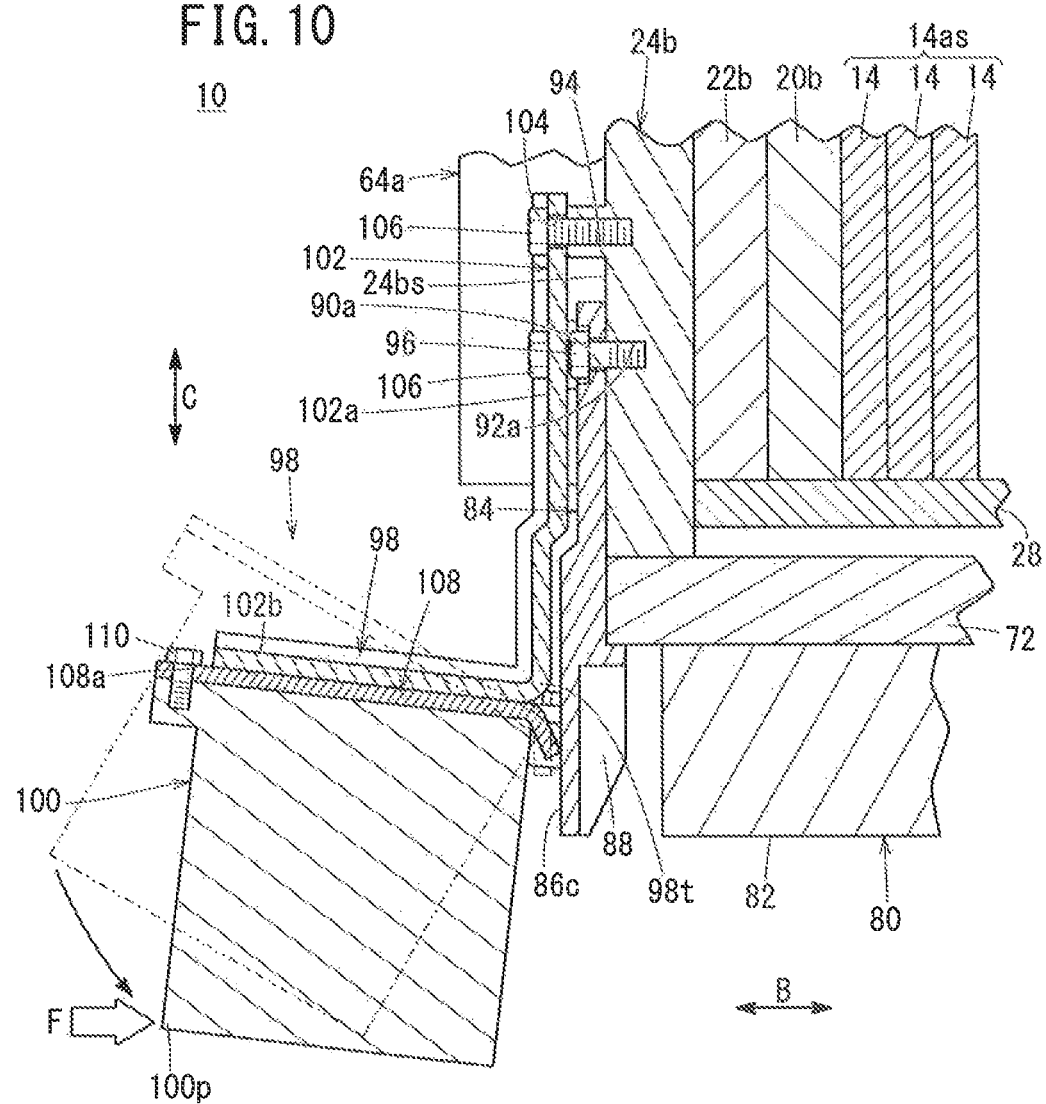
FIG. 10 is a side view showing a state where the external load is applied to the fuel cell electric vehicle.

Specifically, for example, the frame member 12R and members provided inside the frame member 12R may be bent inward by the external load F and then abut against the electric heater 100. As shown in FIG. 10, the electric heater 100 is fixed by the bracket member 98 to the second end plate 24b where the cell voltage control unit 80 is provided. Therefore, when application (of an external load F) to the electric heater 100 occurs at a position below the bending portion of the bracket member 98, the bracket member 98 is deformed and then opened downward. That is, the bracket member 98 is deformed in a manner to increase the opening angle between the surfaces 102a, 102b, so that the electric heater 100 is moved and inclined downward.

In the embodiment of the present invention, the protection member 84 is attached to the second end plate 24b such that the protection member 84 overlaps the bracket member 98. Therefore, when the bracket member 98 is deformed, the bracket member 98 can be held by the protection member 84 suitably.

Further, even when a portion of the bracket member 98 for the electric heater 100 that pushes the protection member 84 abuts against the protection member 84 so that the protection member 84 is deformed, since the clearance C2 is present between the protection member 84 and the cover 82 of the cell voltage control unit 80 (see FIG. 5), it becomes possible to prevent the external load F from being inputted (applied) to the cell voltage control unit 80. In the structure, the external load F is not directly applied to the cell voltage control unit 80, and it is possible to reliably protect the cell voltage control unit 80. Further, the protection member 84 has the protrusions 86a, 86b protruding from both sides of the protection member 84 in the horizontal direction. In this regard, as shown in FIG. 4, the protrusions 86a, 86b lie in the plane of the second end plate 24b. In the structure, as shown in FIG. 9, when the external load F is inputted to the end of the electric heater 100 at an off-center position, a moment load is applied to the protection member 84.

In this case, the protrusions 86a, 86b can reliably receive the moment load in the direction indicated by the arrow A, and suppress deformation of the protection member 84 as much as possible. Further, it becomes possible for the protrusions 86a, 86b to firmly hold the bracket member 98.

Further, as shown in FIG. 5, the bracket member 98 has the first surface 102a fixed to the front surface 24bs of the second end plate 24b, and the second surface 102b holding the electric heater 100. Further, the opening angle $\alpha°$ formed between the first surface 102a and the second surface 102b is an acute angle, e.g., 60°, in the side view of the bracket member 98.

Thus, when the external load F is applied and then inputted to the electric heater 100, the bracket member 98 is deformed plastically (opened downward), and accordingly can absorb the external load F. That is, since the input energy to the electric heater 100 is used to open the bracket member 98, impulsive input to the electric heater 100 is mitigated. Therefore, damage to the electric heater 100, which is a high voltage component, is prevented, and electric stability is ensured.

Moreover, the electric heater 100 has the projection 100p at a position remotest from the second end plate 24b, and the projection 100p is spaced downward from the bending fulcrum 98t of the bracket member 98 by the distance S1. Therefore, as shown in FIG. 10, when an input (external load F) to the projection 100p of the electric heater 100 occurs, the second surface 102b of the bracket member 98 is deformed so as to open downward together with the flat plate 108 and the electric heater 100.

That is, the bracket member 98 is deformed in a direction to increase the opening angle $\alpha°$ formed between the first surface 102a and the second surface 102b, and then the electric heater 100 is moved so as to be inclined downward. Thus, the external load F is not directly applied to the cell voltage control unit 80. With the simple and economical structure, it becomes possible to protect the cell voltage control unit 80 advantageously.

The projection 100p is spaced, by the distance S2, downward from the lower end of the flat plate 108, which extends below the bending fulcrum 98t of the bracket member 98. Thus, in the state where the lower end of the flat plate 108 abuts against the protection member 84, the second surface 102b of the bracket member 98 can be deformed downward together with the flat plate 108 and the electric heater 100. In this regard, the clearance C1 is formed between the bracket member 98 and the protection member 84.

In the structure, when the bracket member 98 is opened, the bracket member 98 does not immediately contact the protection member 84. Thus, input of the load to the protection member 84 is prevented.

Moreover, even when a portion of the bracket member 98 for the electric heater 100 that pushes the protection member 84 abuts against the protection member 84 so that the protection member 84 is deformed, since the clearance C2 is formed between the protection member 84 and the cover 82 of the cell voltage control unit 80, it becomes possible to suitably prevent the external load F from being inputted to the cell voltage control unit 80. It should be noted that, in the case where the cell voltage control unit 80 is provided on the upper surface of the stack body 14*as*, the protection member 84 is provided at an upper position of the second end plate 24*b*.

While the invention has been particularly shown and described with a reference to a preferred embodiment, it will be understood that variations and modifications can be effected thereto by those skilled in the art without departing from the scope of the invention as defined by the appended claims.

What is claimed is:

1. An in-vehicle fuel cell stack comprising a stack body comprising a plurality of power generation cells stacked in a stacking direction, the power generation cells being configured to generate electrical energy by electrochemical reactions of a fuel gas and an oxygen-containing gas, laterally elongated end plates being provided at both ends of the stack body in the stacking direction, the fuel cell stack being mounted in a vehicle,
    wherein a cell voltage control unit connected to a cell voltage terminal configured to monitor cell voltage is provided on an upper surface or a lower surface of the stack body; and
    a protection member is provided on one end plate of the end plates where the cell voltage control unit is provided, and the protection member has protrusions protruding from both sides of the protection member in a horizontal direction, and has a vertically elongated shape so as to extend to a front face of the cell voltage control unit.

2. The in-vehicle fuel cell stack according to claim 1, wherein one end of the protection member in a longitudinal direction extends outward from the one end plate; and
    the protrusions lie in a plane of the one end plate.

3. The in-vehicle fuel cell stack according to claim 1, wherein, at one end of the protection member in a longitudinal direction, a recess is formed in a surface of the protection member that faces the one end plate.

4. An in-vehicle fuel cell stack comprising a stack body comprising a plurality of power generation cells stacked in a stacking direction, the power generation cells being configured to generate electrical energy by electrochemical reactions of a fuel gas and an oxygen-containing gas, laterally elongated end plates being provided upright at both ends of the stack body in the stacking direction, the fuel cell stack being mounted in a vehicle,
    wherein a cell voltage control unit connected to a cell voltage terminal configured to monitor cell voltage is provided on an upper surface or a lower surface of the stack body;
    a bracket member to which a fuel cell auxiliary device is attached is provided on a front surface of one end plate of the end plates where the cell voltage control unit is provided;
    the bracket member is bent in an L-shape, and has a first surface fixed to the front surface of the one end plate and a second surface to which the fuel cell auxiliary device is attached; and
    an acute angle is formed between the first surface and the second surface in a side view of the bracket member.

5. The in-vehicle fuel cell stack according to claim 4, wherein the fuel cell auxiliary device has a projection at a position remotest from the one end plate; and
    the projection is positioned below a bending fulcrum of the bracket member.

6. The in-vehicle fuel cell stack according to claim 5, wherein the projection of the fuel cell auxiliary device is positioned below a lower end of the second surface of the bracket member.

7. The in-vehicle fuel cell stack according to claim 5, wherein the bracket member has a third surface positioned below the bending fulcrum; and
    the projection is positioned below the third surface.

* * * * *